(12) United States Patent
Davis et al.

(10) Patent No.: US 9,896,829 B2
(45) Date of Patent: Feb. 20, 2018

(54) FLUSH VALVE DIAPHRAGM

(71) Applicant: Zurn Industries, LLC, Milwaukee, WI (US)

(72) Inventors: Matthew C. Davis, Raleigh, NC (US); Michael A. Funari, Apex, NC (US); John Kevin Schoolcraft, Sanford, NC (US)

(73) Assignee: Zurn Industries, LLC, Milwaukee, WI (US)

( * ) Notice: Subject to any disclaimer, the term of this patent is extended or adjusted under 35 U.S.C. 154(b) by 92 days.

(21) Appl. No.: 14/850,415

(22) Filed: Sep. 10, 2015

(65) Prior Publication Data

US 2016/0186419 A1 Jun. 30, 2016

Related U.S. Application Data

(60) Provisional application No. 62/049,455, filed on Sep. 12, 2014.

(51) Int. Cl.
*E03D 3/06* (2006.01)
*F16K 31/385* (2006.01)
*F16K 31/145* (2006.01)

(52) U.S. Cl.
CPC .............. *E03D 3/06* (2013.01); *F16K 31/145* (2013.01); *F16K 31/3855* (2013.01)

(58) Field of Classification Search
CPC .. F16K 31/145; F16K 31/3855; F16K 31/385; F16K 31/165; F16K 31/1266; E03D 3/06
USPC ................. 251/29–30.05, 45–46, 331, 335.2
See application file for complete search history.

(56) References Cited

U.S. PATENT DOCUMENTS

| | | | |
|---|---|---|---|
| 1,473,173 A | 11/1923 | Brinkerhoff | |
| 1,598,743 A | 9/1926 | Paul | |
| 1,689,540 A | 10/1928 | Watrous | |
| 1,771,410 A * | 7/1930 | Landis | F16K 7/16 137/625.27 |
| 1,803,418 A | 5/1931 | White | |
| 1,836,976 A | 12/1931 | Krause | |
| 1,912,937 A | 6/1933 | George | |
| 1,964,111 A | 6/1934 | Dobrick | |
| 1,998,155 A | 4/1935 | Cadwell et al. | |
| 2,007,677 A | 7/1935 | Farmer | |
| 2,066,086 A | 12/1936 | Wilson | |
| 2,217,166 A | 10/1940 | Groeniger | |
| 2,270,259 A | 1/1942 | Burke | |
| 2,283,973 A | 5/1942 | Criss | |
| 2,388,990 A | 11/1945 | Nelson et al. | |

(Continued)

FOREIGN PATENT DOCUMENTS

WO WO2014050514 * 4/2014

*Primary Examiner* — Marina Tietjen
(74) *Attorney, Agent, or Firm* — Quarles & Brady LLP

(57) ABSTRACT

A diaphragm for use in a diaphragm-type flush valve includes a flexible diaphragm body having a first side and a second side and an outer periphery, a center passageway defined in the diaphragm body, a bypass orifice defined in the diaphragm body, and a sealing ring attached to the outer periphery of the flexible diaphragm body. The sealing ring defines an outer circumferential surface of the diaphragm. The outer circumferential surface of the sealing ring defines a recessed area. The recessed area is configured to be positioned in a keyed relationship with a flush valve body.

25 Claims, 7 Drawing Sheets

(56) References Cited

U.S. PATENT DOCUMENTS

| | | |
|---|---|---|
| 2,427,441 A | 9/1947 | Butts |
| 2,605,991 A * | 8/1952 | Kaye .................. F16K 7/126 251/275 |
| 2,630,831 A | 3/1953 | Arnold |
| 2,840,339 A | 6/1958 | Price |
| 2,916,251 A | 12/1959 | Butts |
| 3,011,751 A | 12/1961 | Delany et al. |
| 3,083,943 A | 4/1963 | Stewart, Jr. et al. |
| 3,085,779 A | 4/1963 | Philippe |
| 3,154,288 A | 10/1964 | Tripoli |
| 3,166,289 A | 1/1965 | Engstrom |
| 3,279,742 A | 10/1966 | Billeter |
| 3,291,439 A | 12/1966 | Goldstein |
| 3,347,519 A | 10/1967 | Engstrom |
| 3,399,860 A | 9/1968 | Billeter et al. |
| 3,585,905 A | 6/1971 | Mason et al. |
| 3,656,499 A | 4/1972 | Nelson et al. |
| 3,659,448 A | 5/1972 | Schaus |
| 3,732,884 A | 5/1973 | Strom |
| 3,791,618 A | 2/1974 | Nelson et al. |
| 3,904,168 A * | 9/1975 | Marocco .............. F16K 31/404 251/30.03 |
| 4,022,114 A | 5/1977 | Hansen, III et al. |
| 4,327,891 A | 5/1982 | Allen et al. |
| D268,048 S | 2/1983 | Ueda |
| 4,869,286 A | 9/1989 | Williams et al. |
| 4,883,254 A | 11/1989 | Whiteside |
| 4,913,182 A | 4/1990 | Whiteside |
| 4,971,287 A | 11/1990 | Shaw |
| D316,292 S | 4/1991 | Baker |
| 5,026,021 A | 6/1991 | Pino |
| 5,150,877 A | 9/1992 | Whiteside et al. |
| 5,232,194 A | 8/1993 | Saadi et al. |
| 5,271,600 A | 12/1993 | Saadi et al. |
| 5,295,655 A | 3/1994 | Wilson et al. |
| 5,295,662 A * | 3/1994 | Yamaji .................. F16K 41/12 251/274 |
| 5,332,192 A | 7/1994 | Whiteside |
| 5,335,694 A | 8/1994 | Whiteside |
| 5,415,374 A | 5/1995 | Carroll et al. |
| 5,431,181 A | 7/1995 | Saadi et al. |
| 5,465,748 A | 11/1995 | Bowers |
| 5,490,659 A | 2/1996 | Whiteside |
| 5,649,686 A | 7/1997 | Wilson |
| 5,699,717 A | 12/1997 | Riedlinger |
| 5,865,420 A | 2/1999 | Wilson |
| 5,967,182 A | 10/1999 | Wilson |
| 6,047,953 A | 4/2000 | Jacob, Jr. |
| 6,105,926 A | 8/2000 | Oliver et al. |
| 6,182,689 B1 | 2/2001 | Lauer et al. |
| 6,183,636 B1 | 2/2001 | Bowers et al. |
| 6,299,127 B1 | 10/2001 | Wilson |
| 6,299,128 B1 | 10/2001 | Verdecchia |
| 6,550,744 B2 | 4/2003 | Nortier |
| 6,616,118 B2 | 9/2003 | Nortier |
| 6,616,119 B2 | 9/2003 | Wilson |
| 6,659,420 B2 | 12/2003 | Hwang et al. |
| 6,719,268 B2 | 4/2004 | Fukano et al. |
| 6,722,384 B2 | 4/2004 | Gates |
| 6,913,239 B2 | 7/2005 | Nortier |
| 6,923,425 B2 | 8/2005 | Verdecchia |
| 6,926,247 B2 | 8/2005 | Nortier |
| 6,971,634 B2 | 12/2005 | Funari et al. |
| 7,028,704 B2 | 4/2006 | Taylor et al. |
| 7,063,103 B2 | 6/2006 | Guler et al. |
| 7,063,304 B2 | 6/2006 | Leys |
| 7,108,240 B2 | 9/2006 | Funari et al. |
| 7,516,754 B2 | 4/2009 | Verdecchia |
| 7,516,938 B2 | 4/2009 | Funari et al. |
| 7,527,241 B2 | 5/2009 | Lodolo |
| 7,556,237 B2 | 7/2009 | Johnson |
| 7,607,635 B2 | 10/2009 | Wilson |
| 7,922,147 B2 | 4/2011 | O'Connor et al. |
| 7,980,528 B2 | 7/2011 | Wilson |
| 8,033,522 B2 | 10/2011 | Wilson |
| 8,100,854 B2 | 1/2012 | Voegelin et al. |
| 8,172,275 B2 | 5/2012 | Sumrall, Jr. et al. |
| 8,210,202 B2 | 7/2012 | Verdecchia |
| 8,235,352 B2 | 8/2012 | Irwin et al. |
| 8,286,934 B2 | 10/2012 | Wilson |
| 8,297,296 B2 | 10/2012 | O'Connor et al. |
| 8,317,155 B2 | 11/2012 | Maercovich |
| 8,322,682 B2 | 12/2012 | Maercovich |
| 8,632,048 B2 | 1/2014 | Wilson |
| 2004/0094734 A1* | 5/2004 | Funari ...................... E03D 3/06 251/40 |
| 2004/0239021 A1 | 12/2004 | Itoh et al. |
| 2005/0087710 A1 | 4/2005 | Nortier |
| 2005/0224735 A1 | 10/2005 | Funari et al. |
| 2007/0161940 A1 | 7/2007 | Blanchard et al. |
| 2007/0272887 A1* | 11/2007 | Carroll .................... E03D 3/04 251/40 |
| 2008/0006788 A1 | 1/2008 | Johnson |
| 2008/0006789 A1 | 1/2008 | Johnson |
| 2008/0196159 A1 | 8/2008 | Lee |
| 2008/0290311 A1* | 11/2008 | O'Connor ........... F16K 31/3855 251/331 |
| 2009/0039299 A1* | 2/2009 | Wilson .................... E03D 3/06 251/40 |
| 2009/0284005 A1 | 11/2009 | Sumrall, Jr. et al. |
| 2009/0308460 A1* | 12/2009 | Tschurtz ................. F16K 7/17 137/12 |
| 2011/0150602 A1 | 6/2011 | Sieber et al. |
| 2011/0186163 A1 | 8/2011 | Farag |
| 2011/0248197 A1 | 10/2011 | Wilson |
| 2015/0144822 A1* | 5/2015 | Akamoto ................ F16K 7/123 251/213 |

* cited by examiner

FLUSH VALVE DIAPHRAGM

CROSS REFERENCE TO RELATED APPLICATION

This application claims the benefit of U.S. Provisional Patent Application No. 62/049,455, filed Sep. 12, 2014, the disclosure of which is incorporated in its entirety herein.

BACKGROUND OF THE INVENTION

Field of the Invention

The present invention relates to flush valves, and more particularly, to diaphragms used in flush valves.

Description of Related Art

Flush valves in water closets, urinals, and other plumbing devices which utilize a flexible diaphragm to establish and to seal off the connection between the inlet and outlet are well-known in the art. Typically, the diaphragm is made of an elastomeric material, such as rubber, and includes a filter and bypass, which provides fluid communication between the inlet side of the flush valve and an upper chamber of the flush valve. Such flush valve diaphragms are described in U.S. Pat. Nos. 7,516,938 and 8,210,202, which are hereby incorporated by reference in their entirety.

The performance of prior art diaphragm-type flush valves can depend upon how well the diaphragm seals off the connection between the inlet and the outlet. The performance also depends on the pressure drop between the opposite sides of the diaphragm due to the bypass orifice. A diaphragm with a misaligned bypass orifice can prevent water from flowing to the top side of the diaphragm, which results in an inadequate seal. The correct positioning of the bypass orifice within the flush valve is paramount to ensuring that the proper pressure drop is established between the opposite sides of the diaphragm.

Accordingly, there is a general need in the art for a flush valve assembly and flush valve diaphragm that are configured so as to ensure correct positioning of the bypass orifice with respect to the body of the flush valve assembly during installation of the flush valve diaphragm and diaphragm assembly.

SUMMARY OF THE INVENTION

The present invention provides for a diaphragm for use in a diaphragm-type flush valve, the diaphragm including a flexible diaphragm body having a first side and a second side and defining an outer periphery, a center passageway defined in the diaphragm body, a bypass orifice defined in the diaphragm body, and a sealing ring attached to the outer periphery of the flexible diaphragm body. The sealing ring defines an outer circumferential surface of the diaphragm. The outer circumferential surface of the sealing ring defines a recessed area.

In another embodiment of the invention, the sealing ring may include an inner ring attached to the outer periphery of the diaphragm body and an outer ring which defines the outer circumferential surface of the sealing ring. The outer ring of the sealing ring may define the recessed area. The recessed area may be configured to engage in a keyed relationship with a valve body of a flush valve. A shape of the recessed area may be defined by an indentation in the sealing ring and an imaginary line that extends along the outer circumferential surface of the sealing ring from a first end of the indentation to a second end of the indentation. The recessed area may be substantially rectangular-shaped. The recessed area may be defined in the sealing ring at a predetermined angular position with respect to the bypass orifice. The recessed area may be positioned approximately 90 degrees from the bypass orifice. The recessed area may be positioned approximately 135 degrees from the bypass orifice. The sealing ring may be configured to create a seal between the diaphragm and a valve body. A first plurality of protruding ribs may include a first and a second protruding rib on the first side of the diaphragm body. Each of the first and second protruding ribs may have a first end adjacent the bypass orifice and extending in a curved line to a second end, and a third protruding rib on the first side of the diaphragm body that may be substantially U-shaped with a first end and a second end. An open end of the U-shaped third protruding rib may be oriented toward the center passageway. The first protruding rib and a portion of the third protruding rib may define a first channel therebetween, and the second protruding rib and an opposing portion of the third protruding rib may define a second channel therebetween. A second plurality of protruding ribs may be positioned on the second side of the diaphragm body with a first end positioned adjacent to the center passageway and a second end positioned adjacent to the sealing ring. The second plurality of protruding ribs may be curved between the first end and the second end.

Another embodiment of the invention is a flush valve that includes a valve body having an inlet and an outlet, a barrel section having a sealing end positioned within the valve body, the sealing end defined between the inlet and the outlet, wherein the barrel section adapts to fluidly connect the inlet to the outlet, and a diaphragm positioned in the valve body and separating the inlet and the outlet, the diaphragm configured to have a pressure differential applied across the diaphragm. The diaphragm includes a flexible diaphragm body having an outer periphery, a first side, and a second side adapted to seal against the sealing end of the barrel section, the diaphragm body defining a center passageway and a bypass orifice spaced radially from the center passageway, and a sealing ring attached to the outer periphery of the flexible diaphragm body. The sealing ring defines an outer circumferential surface of the diaphragm. The diaphragm and the valve body are configured to engage in a keyed relationship.

The sealing ring may include an inner ring attached to the outer periphery of the diaphragm body and an outer ring which defines the outer circumferential surface of the sealing ring. The outer circumferential surface of the sealing ring may define a recessed area. The valve body may include a protrusion extending from an inner surface thereof. The recessed area and the protrusion may be configured to engage in the keyed relationship between the diaphragm and the valve body. A shape of the recessed area may be defined by an indentation in the sealing ring and an imaginary line that extends along the outer circumferential surface of the sealing ring from a first end of the indentation to a second end of the indentation. The recessed area and the protrusion may have corresponding shapes. The recessed area may be substantially rectangular or trapezoidal-shaped and the protrusion may be substantially rectangular or trapezoidal-shaped. The recessed area may be defined in the sealing ring at a predetermined angular position with respect to the bypass orifice. The recessed area may be positioned approximately 90 degrees from the bypass orifice. The recessed area may be positioned approximately 135 degrees from the bypass orifice. The sealing ring may be configured to create a seal between the diaphragm and the valve body.

The present invention is also a method of assembling a flush valve assembly includes the steps of providing a flush valve diaphragm for use in a flush valve comprising a diaphragm body with an outer periphery, a first side, and a second side, and a sealing ring attached to the outer periphery of the diaphragm body, the sealing ring defining an outer circumferential surface of the diaphragm; providing a flush valve body having an inlet and an outlet; positioning the flush valve diaphragm in the flush valve body by positioning the flush valve diaphragm into a keyed relationship with the flush valve body; and establishing a seal between the sealing ring of the flush valve diaphragm and the flush valve body.

The outer circumferential surface of the sealing ring may define a recessed area. The flush valve body may include a protrusion extending from an inner surface. The recessed area and the protrusion may be configured to engage in the keyed relationship between the flush valve diaphragm and the flush valve body. The recessed area of the flush valve diaphragm and the protrusion of the flush valve body may have corresponding shapes. The method may also include the step of defining a bypass orifice in the flush valve diaphragm at a predetermined angular distance from the recessed area of the flush valve diaphragm.

Further details and advantages of the invention will become clear upon reading the following detailed description in conjunction with the accompanying drawing figures, wherein like parts are designated with like reference numerals throughout.

DETAILED DESCRIPTION OF THE PREFERRED EMBODIMENTS

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

Figure 1:
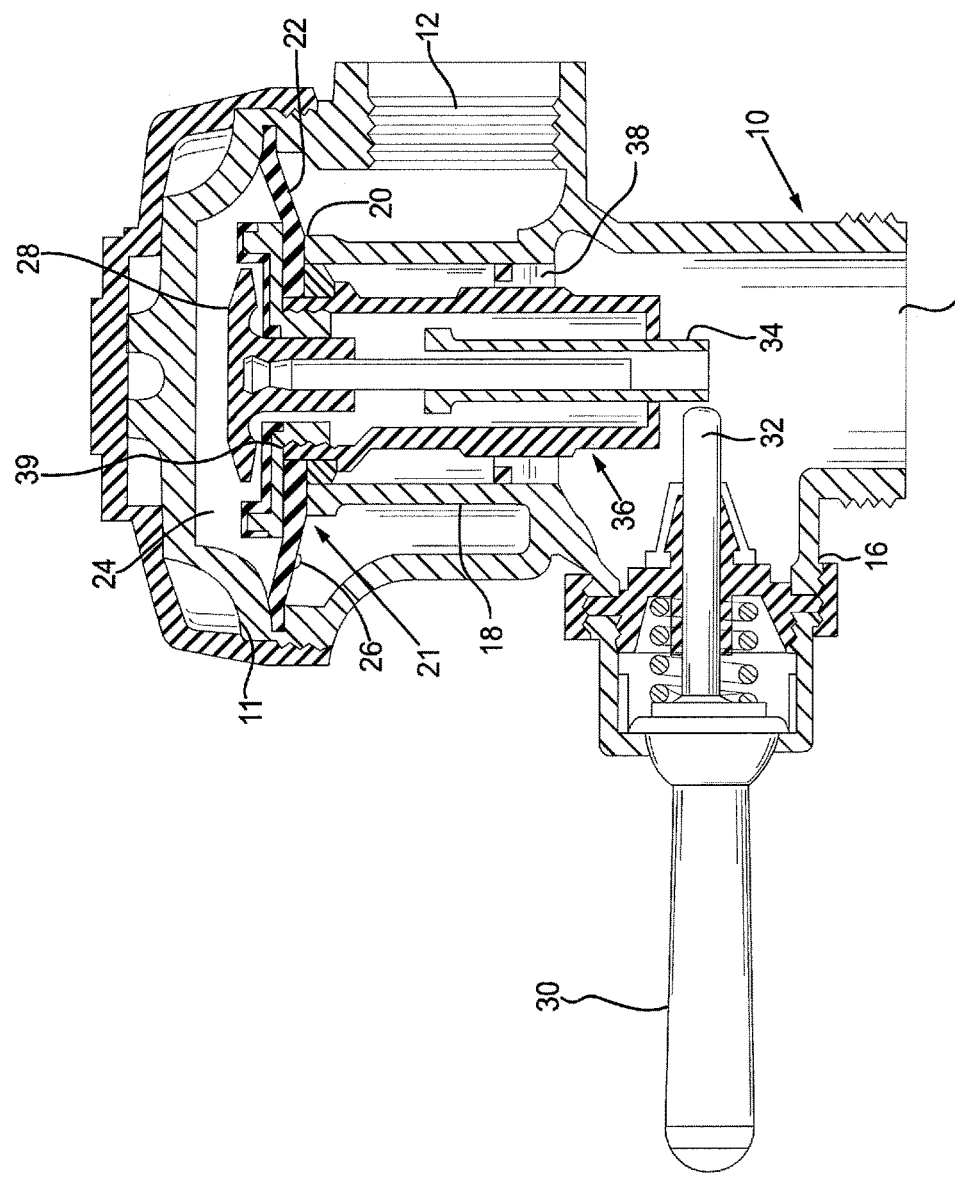
FIG. 1 is a partial sectional elevation view of a prior art flush valve and conventional diaphragm assembly.

Flush valves in water closets, urinals, and other plumbing devices which utilize a flexible diaphragm to establish and to seal off the connection between the inlet and outlet are well-known in the art. FIG. 1 illustrates a typical prior art flush valve and diaphragm assembly. The flush valve has a hollow valve body 10, generally made of brass, which includes an inlet 12, an outlet 14, and a handle connection 16. Of course, the body can be made of other materials. A barrel section 18 is positioned within the flush valve such that the connection between the inlet 12 and the outlet 14 is through the barrel section 18. An annular main valve seat 20 is formed on a top or sealing end 21 of the barrel section 18. The annular main valve seat 20 is normally closed by a diaphragm 22 extending across the body 10 and defining an upper chamber 24. The diaphragm 22 has a bypass 26 which provides fluid communication between the inlet 12 of the flush valve and the upper chamber 24. The diaphragm 22 is attached at its outer edge to the valve body 10 and is clamped in place by an annular clamping rim on an outer cover 11 of the body 10. The diaphragm 22 has an opening which allows for fluid communication between the upper chamber 24 and the outlet 14. A relief valve 28 normally closes the opening at the center of the diaphragm 22.

The operation of the flush valve is generally as follows. In the normally closed position shown in FIG. 1, water pressure at the valve inlet 12 is communicated to the upper chamber 24 through a bypass 26 defined in the diaphragm 22. Because the surface area which is subjected to water pressure is greater on the upper side of the diaphragm 22, the water pressure forces the diaphragm 22 down on to the sealing end 21 of the barrel section 18 (i.e., main valve seat 20), thus preventing water from flowing to the outlet 14. When the user moves a handle 30 in any direction, a plunger 32 moves inwardly tilting a stem 34 of the relief valve 28. This releases the pressure in upper chamber 24 by allowing water to flow through a guide member 36. With the upper chamber pressure relieved, the inlet water pressure forces the diaphragm 22 upwardly, off the main valve seat 20, allowing water to flow directly from the inlet 12 through the barrel section 18 to the outlet 14. When the diaphragm 22 and the relief valve 28 move upwardly, the relief valve 28 resets itself, closing off the upper chamber 24. Water will then flow through the bypass 26 into the upper chamber 24 until the diaphragm 22 is again forced against the main valve seat 20, thereby closing the valve. The guide member 36 moves the diaphragm 22 and includes outwardly-extending radial wing members 38 which engage the inner surface of the barrel section 18 to guide the guide member 36 and the attached diaphragm 22, as the diaphragm 22 moves up and down. The diaphragm 22 defining a central passageway 39 (i.e., hole) is radially spaced from the central passageway 39.

Figure 2:
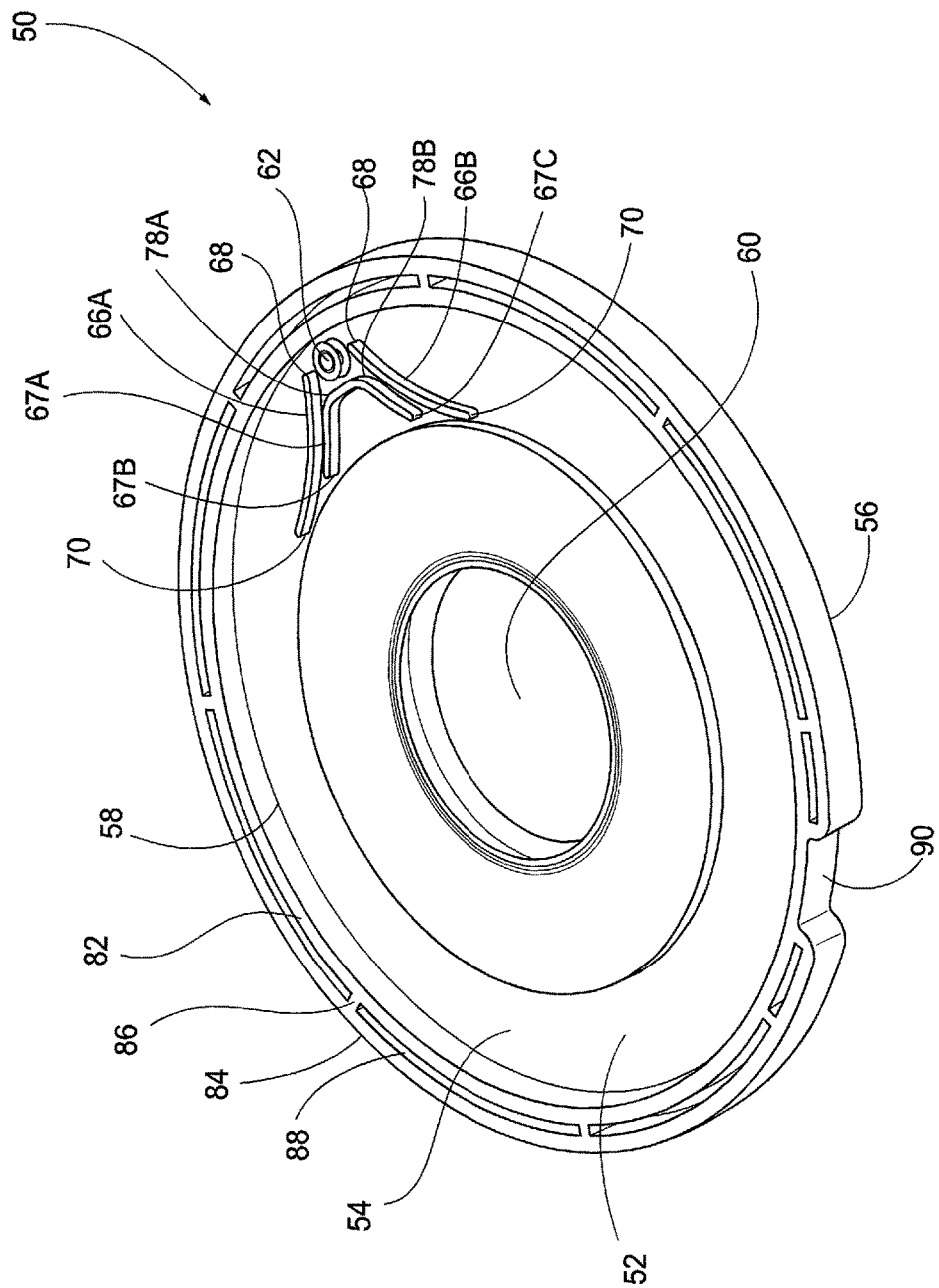
FIG. 2 is a top perspective view of a flush valve diaphragm made in accordance with the present invention.
Figure 3:
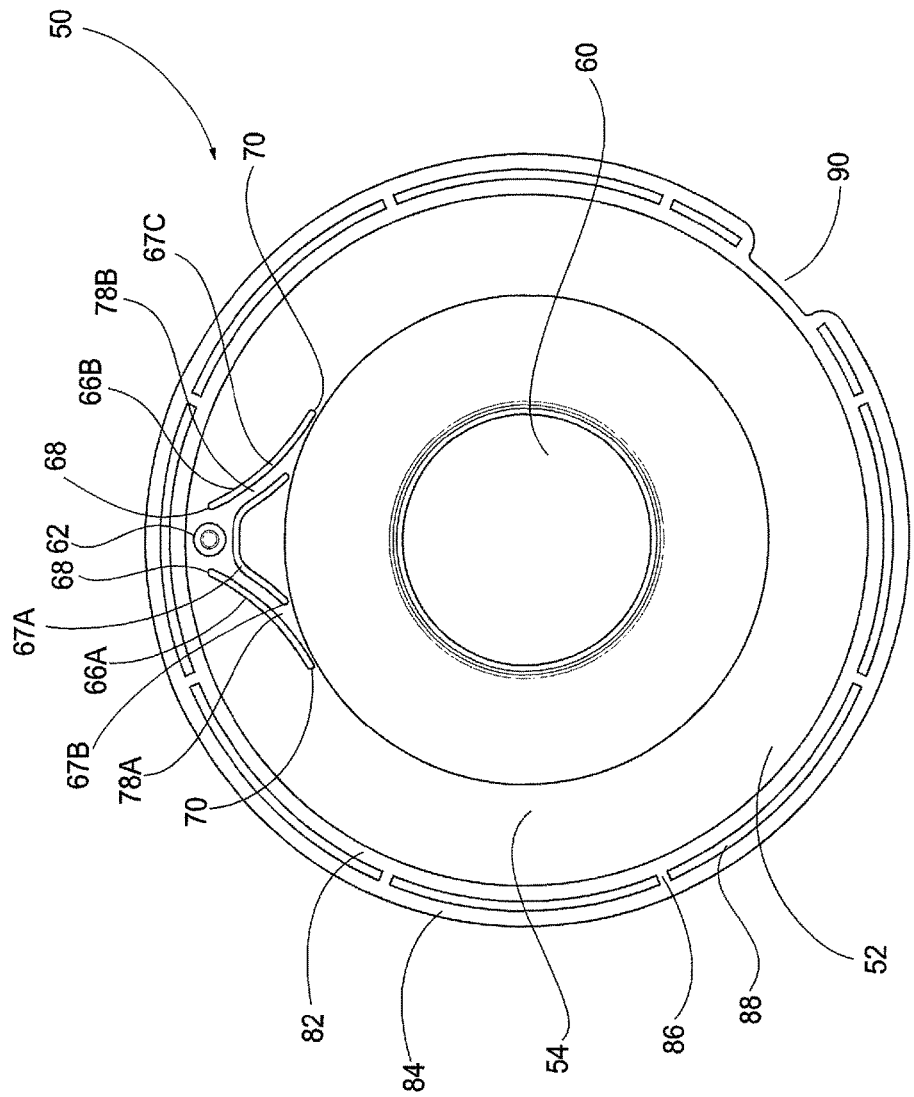
FIG. 3 is a top view of the flush valve diaphragm shown in FIG. 2.
Figure 4:
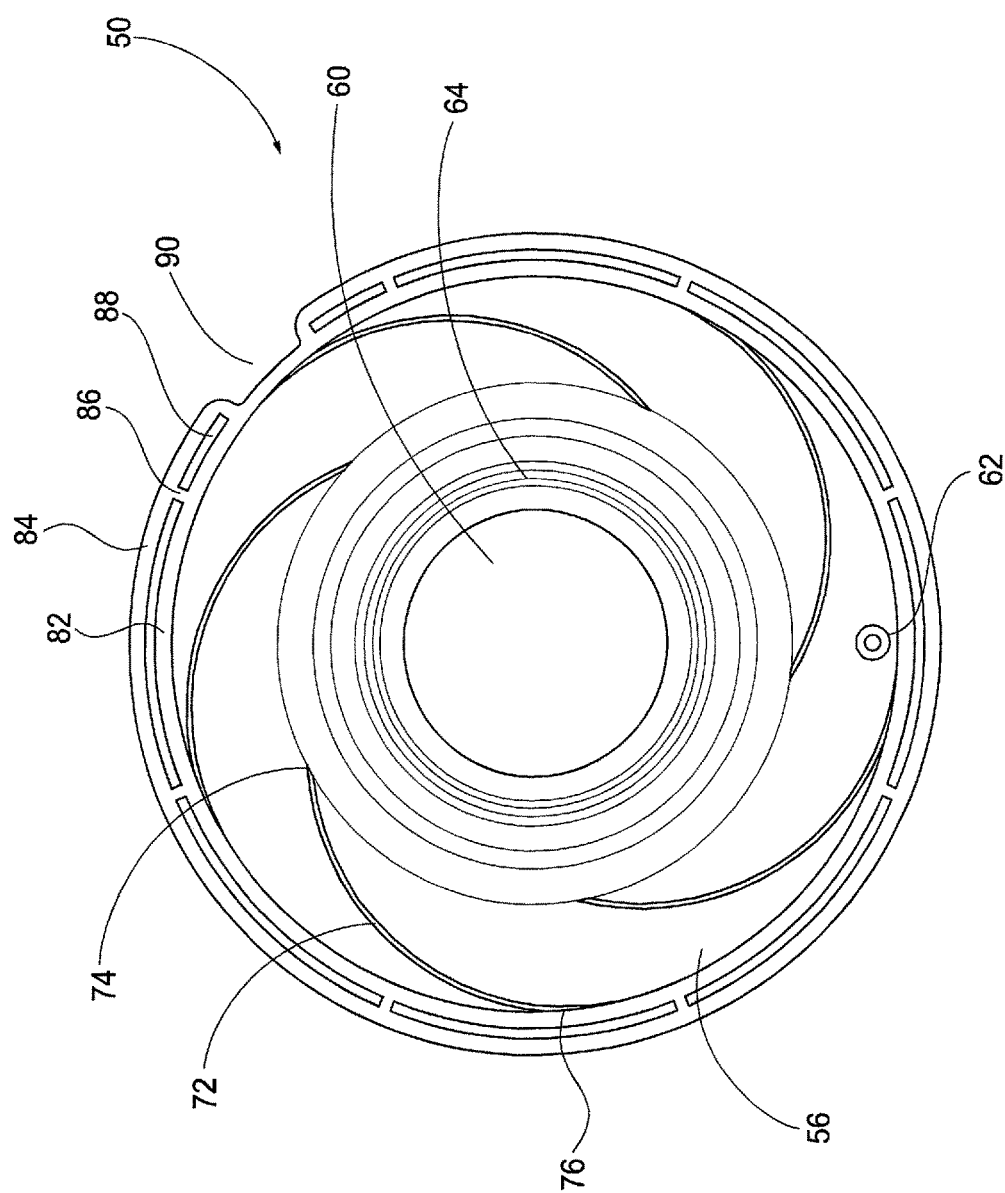
FIG. 4 is a bottom view of the flush valve diaphragm shown in FIG. 2.
Figure 5:
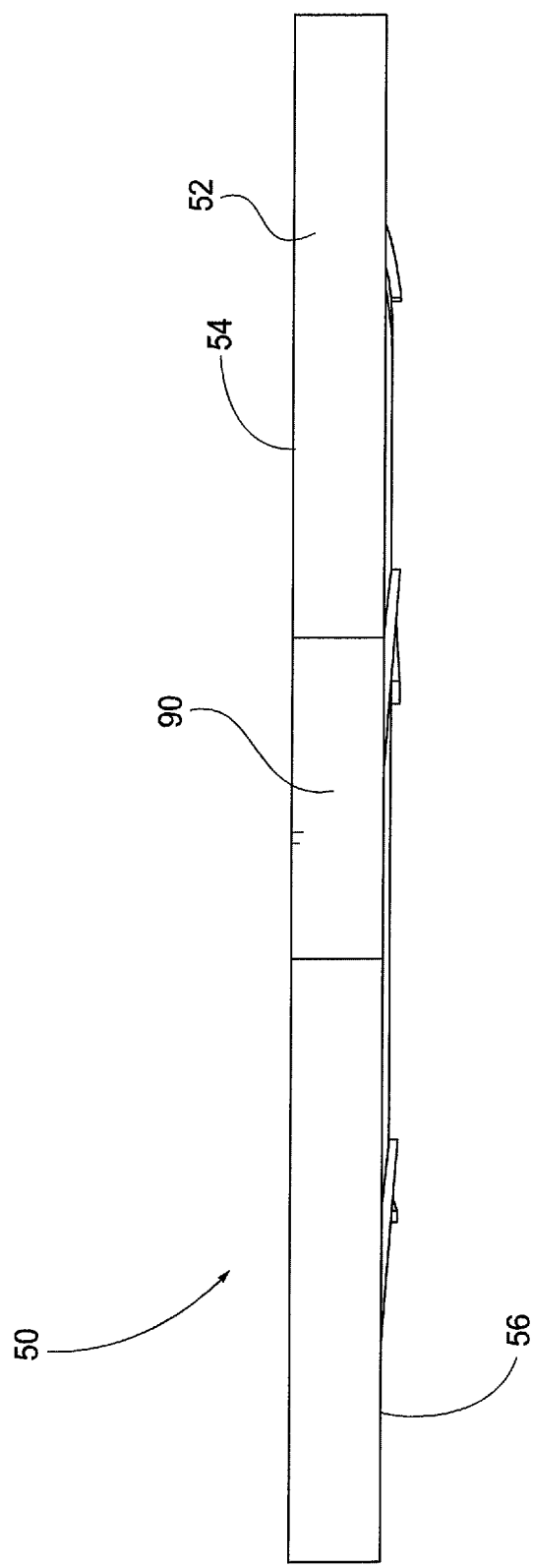
FIG. 5 is a side elevation view of the flush valve diaphragm shown in FIG. 2.

FIGS. 2-4 show a flush valve diaphragm 50 made in accordance with the present invention. In addition to being used in a corresponding flush valve assembly as described below with reference to FIGS. 6-7B, the diaphragm 50 may also replace the diaphragm 22 in the prior art flush valve as shown, for example, in FIG. 1. The diaphragm 50 operates in an analogous manner to the diaphragm 22 and bypass 26 as previously described. The diaphragm 50 includes a flexible diaphragm body 52 having a first side 54 and a second side 56 and defining an outer periphery 58.

Referring to FIGS. 2-6, the diaphragm body 52 defines a center passageway 60, a bypass orifice 62 spaced radially from the center passageway 60, an annular protrusion 64 on the second side 56 of the diaphragm body 52 adjacent the center passageway 60, two protruding ribs 66A, 66B having first ends 68 and second ends 70 on the first side 54 of the diaphragm body 52 adjacent the bypass orifice 62, a third protruding rib 67A having a first end 67B and a second end 67C on the first side 54 of the diaphragm body 52 adjacent the bypass orifice 62, and a plurality of protruding ribs 72 having a first end 74 and a second end 76 on the second side 56 of the diaphragm body 52 adjacent the protrusion 64. The bypass orifice 62 is adapted to receive a flush valve diaphragm orifice insert as disclosed in U.S. Pat. No. 7,516,938 to Funari et al.

With continued reference to FIGS. 2-6, the protruding ribs 66A, 66B each include a first end 68 positioned adjacent the bypass orifice 62 and a second end 70, which is radially inwardly spaced and angularly spaced from the first end 68. The protruding ribs 66A, 66B extend in opposing angular directions from the respective first ends 68. The protruding rib 67A is substantially U-shaped and is positioned between the bypass orifice 62 and the center passageway 60. The open end of the U-shaped protruding rib 67A is directed towards the center passageway 60 so that the first end 67B and the second end 67C of the protruding rib 67A are positioned closer to the center passageway 60 with respect to the center of the protruding rib 67A. A first channel 78A is defined between the protruding rib 66A and the protruding rib 67A and a second channel 78B is defined between the protruding rib 66B and the protruding rib 67A on the side opposite from the protruding rib 66A. The channels 78A, 78B are used to direct the flow of water away from the bypass orifice 62.

With continued reference to FIGS. 2-6, the first end 74 of each second protruding rib 72 is positioned closer to the center passageway 60 than the second end 76 and each protruding rib 72 extends radially outwardly and angularly in a curved line to the respective second end 76 of the second protruding rib 72. The first end 74 of each second protruding rib 72 is positioned adjacent the annular protrusion 64. The ribs 66A, 66B, 67A, and 72 provide strength to the diaphragm body 52 in order to prevent distortion that results from flexing the diaphragm body 52.

The annular protrusion 64 is defined on the second side 56 of the diaphragm body 52 adjacent the center passageway 60. An annular seat 80 (FIG. 6) is provided on the second side 56 of the diaphragm body 52 adjacent the annular protrusion 64. The annular seat 80 is adapted to receive a sealing end 21 of a barrel section 18 in a valve body 10. The diaphragm body 52 (FIG. 5) can be annular shaped and made of a flexible polymeric material, such as rubber. Although not shown, the diaphragm 50 can be connected to a barrel, which can be integrally formed thereto or attached as a separate piece, as shown in U.S. Pat. No. 6,299,128 to Verdecchia.

Figure 6:
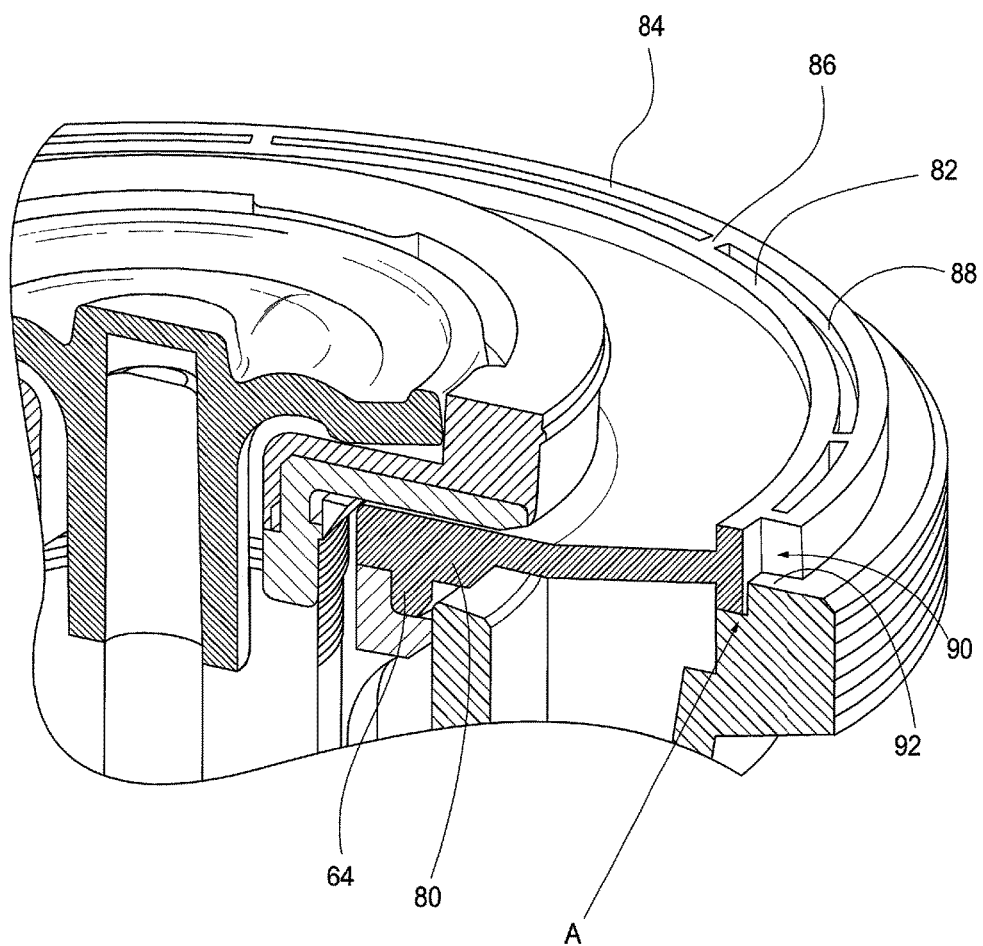
FIG. 6 is a partial sectional perspective view of a flush valve assembly including the flush valve diaphragm shown in FIG. 2.
Figure 7A:
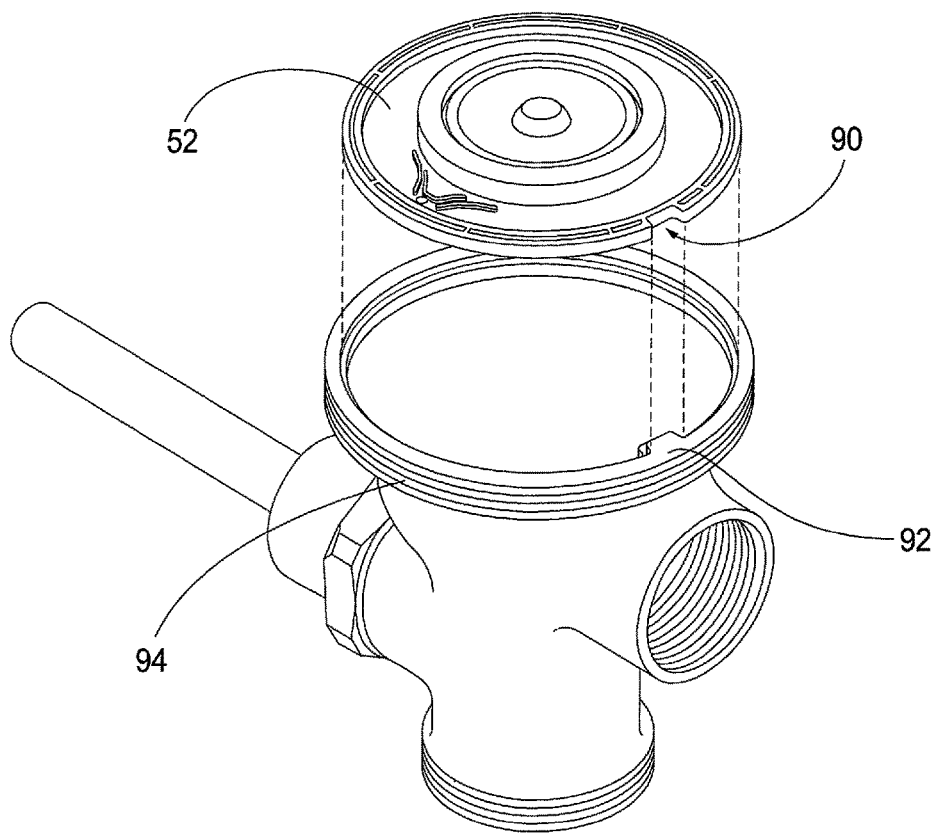
FIG. 7A is a top perspective view of a flush valve assembly including the flush valve diaphragm shown in FIG. 2.
Figure 7B:
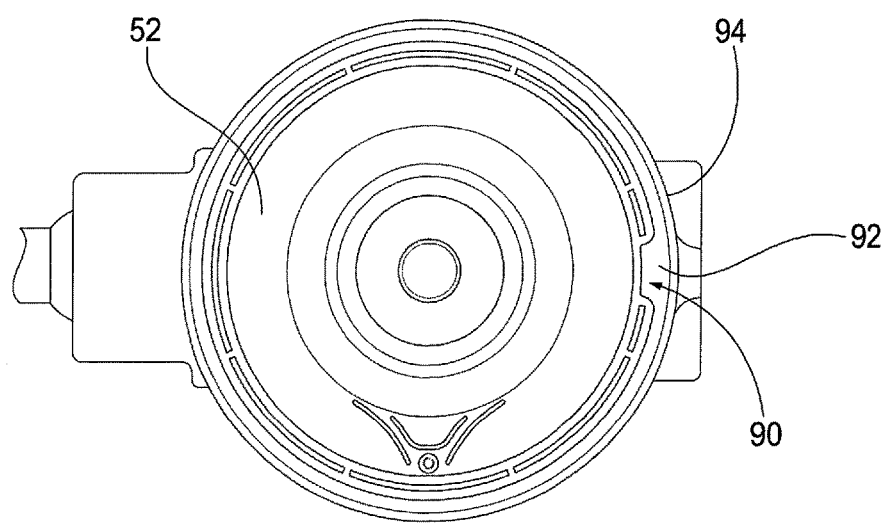
FIG. 7B is a top plan view of a flush valve assembly including the flush valve diaphragm shown in FIG. 2.

With continued reference to FIGS. 2-6, the diaphragm body 52 also includes a sealing ring configured to establish a seal between the diaphragm body 52 and a valve body 94 (shown in FIG. 7B). The sealing ring includes an inner ring 82 adjacent to the outer periphery 58 of the diaphragm body 52, an outer ring 84 at the periphery, and a plurality of radially-extending bands 86 between the inner ring 82 and the outer ring 84. The outer ring 84 defines an outer circumferential surface of the sealing ring. The ends of the bands 86 may be formed integral with the inner ring 82 and the outer ring 84. A plurality of cavity sections 88 may be defined between the inner ring 82 and the outer ring 84. Each cavity section 88 is separated by the bands 86.

With continued reference to FIGS. 2-6, a recessed area 90 is defined by the outer ring 84 of the sealing ring of the diaphragm body 52. The term recessed area 90 is defined as an indentation in a peripheral surface of the diaphragm 50. The recessed area 90 may be defined by the indentation in the outer periphery of the outer ring 84 and an imaginary line that connects both sides of the indentation along the outer periphery of the outer ring 84. In one embodiment, the recessed area 90, when viewed from the top, is substantially rectangular or trapezoidal-shaped. It is to be understood, however, that additional recessed area 90 shapes are contemplated, such as, triangular, circular, spherical, hexagonal, octagonal, or square, among other shapes. The recessed area 90 is defined within the outer ring 84 and a cavity section 88 of the diaphragm body 52, and extends from an outer surface of the outer ring 84 to an outer surface of the inner ring 82. As shown in FIGS. 7A and 7B, the recessed area 90 is configured to engage into a keyed relationship or interlocking engagement with a corresponding protrusion 92 on an inner surface of the valve body 10. The shape of the recessed area 90 and the protrusion 92 should correspond to one another to create the keyed relationship. During assembly of the flush valve assembly, the diaphragm 50 cannot be fully assembled into the valve body 10 to create a seal with the valve body 10 until the recessed area 90 and the protrusion 92 engage in the keyed relationship. A keyed relationship is understood to mean that the protrusion 92 is positioned for insertion into the recessed area 90 of the diaphragm 50 or, alternatively, the recessed area 90 is positioned around the protrusion 92. As shown in FIG. 6, even with the recessed area 90 being defined in the outer ring 84 of the diaphragm body 52, a seal is still maintained between the inner ring 82 and the valve body 10 at point A. Therefore, the diaphragm 50 with the recessed area 90 defined therein can also be used with valve bodies without a protrusion 92, such as pre-existing valve bodies that have already been installed and are using pre-existing diaphragm without a recess. Therefore, the diaphragm 50 includes an advantage of being capable of use with pre-existing valve bodies that do not include a corresponding protrusion or valve bodies 10 that are formed with a protrusion 92. It is also contemplated that the protrusion 92 may be provided on the diaphragm 50 and the recessed area 90 may be defined by the valve body 10 to create a keyed relationship between the diaphragm 50 and the valve body 10.

Through the use of the keyed relationship between the recessed area 90 and the protrusion 92, an accurate and consistent positioning of the bypass orifice 62 is achieved. By defining the recessed area 90 at a predetermined angular position from the bypass orifice 62 on the outer ring 84 of the diaphragm 50, an accurate positioning of the bypass orifice 62 in the flush valve assembly is achieved consistently through assembly of multiple flush valves. Therefore, every time the recessed area 90 engages in the keyed relationship with the protrusion 92, the bypass orifice 62 is positioned at the desired position. In one embodiment of the present invention, the center of the recessed area 90 of the diaphragm 50 is angularly spaced approximately 90 degrees from the bypass orifice 62. In another embodiment of the present disclosure, the center of the recessed area 90 of the diaphragm 50 is angularly spaced approximately 135 degrees away from the bypass orifice 62. It is to be understood, however, that any number of positions are contemplated for the recessed area 90 and the protrusion 92 depending on the design of the flush valve assembly.

With reference to FIGS. 7A and 7B, a method of assembling a flush valve assembly is also contemplated with this disclosure. This method includes providing a diaphragm 50 as described hereinabove including a recessed area 90 defined in the outer ring 84 of the sealing ring of the diaphragm 50. The flush valve body 94 includes a protrusion extending from an inner surface of the flush valve body 94. The diaphragm 50 is positioned in the flush valve body 94 by positioning the recessed area 90 of the diaphragm 50 into a keyed relationship with the protrusion 92 of the flush valve body 94. In this keyed relationship, the protrusion 92 extends into the recessed area 90 of the diaphragm 50. A seal is then established between the inner ring 82 of the sealing ring of the diaphragm 50 and the flush valve body 94. When assembling a flush valve assembly using this method, the recessed area 90 and the protrusion 92 preferably have corresponding shapes so as to fit together in a keyed relationship. It is also contemplated that a bypass orifice 62 may be defined in the diaphragm 50. The bypass orifice 62 may be positioned at a predetermined position from the recessed area 90 of the diaphragm 52 to ensure that the bypass orifice 62 is accurately and consistently positioned in the flush valve assembly.

While several embodiments of a flush valve diaphragm are shown in the accompanying figures and described hereinabove in detail, other embodiments will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A diaphragm for use in a diaphragm-type flush valve, the diaphragm comprising:
   a flexible diaphragm body having a first side and a second side and defining an outer periphery;
   a center passageway defined in the diaphragm body;
   a bypass orifice defined in the diaphragm body;
   a sealing ring attached to the outer periphery of the flexible diaphragm body, the sealing ring defining an outer circumferential surface of the diaphragm; and
   a first plurality of protruding ribs comprising:
      a first and a second protruding rib on the first side of the diaphragm body, each of the first and second protruding ribs having a first end adjacent the bypass orifice and extending in a curved line to a second end; and
      a third protruding rib on the first side of the diaphragm body that is substantially U-shaped with a first end and a second end, wherein an open end of the U-shaped third protruding rib is oriented toward the center passageway;
   wherein the outer circumferential surface of the sealing ring defines a recessed area.

2. The diaphragm as claimed in claim 1, wherein the sealing ring comprises:
   an inner ring attached to the outer periphery of the diaphragm body; and
   an outer ring which defines the outer circumferential surface of the sealing ring,
   wherein the outer ring of the sealing ring defines the recessed area.

3. The diaphragm as claimed in claim 1, wherein the recessed area is configured to engage in a keyed relationship with a valve body of a flush valve.

4. The diaphragm as claimed in claim 1, wherein a shape of the recessed area is defined by an indentation in the sealing ring and an imaginary line that extends along the outer circumferential surface of the sealing ring from a first end of the indentation to a second end of the indentation.

5. The diaphragm as claimed in claim 4, wherein the recessed area is substantially rectangular-shaped.

6. The diaphragm as claimed in claim 1, wherein the recessed area is defined in the sealing ring at a predetermined angular position with respect to the bypass orifice.

7. The diaphragm as claimed in 6, wherein the recessed area is positioned approximately 90 degrees from the bypass orifice.

8. The diaphragm as claimed in claim 6, wherein the recessed area is positioned approximately 135 degrees from the bypass orifice.

9. The diaphragm as claimed in claim 1, wherein the sealing ring is configured to create a seal between the diaphragm and a valve body.

10. The diaphragm as claimed in claim 1, wherein the first protruding rib and a portion of the third protruding rib define a first channel therebetween, and the second protruding rib and an opposing portion of the third protruding rib define a second channel therebetween.

11. The diaphragm as claimed in claim 1, further comprising a second plurality of protruding ribs on the second side of the diaphragm body with a first end positioned adjacent to the center passageway and a second end positioned adjacent to the sealing ring,
   wherein the second plurality of protruding ribs are curved between the first end and the second end.

12. A flush valve, comprising:
   a valve body having an inlet and an outlet;
   a barrel section having a sealing end positioned within the valve body, the sealing end defined between the inlet and the outlet, wherein the barrel section adapts to fluidly connect the inlet to the outlet; and
   a diaphragm positioned in the valve body and separating the inlet and the outlet, the diaphragm configured to have a pressure differential applied across the diaphragm, the diaphragm comprising:
      a flexible diaphragm body having an outer periphery, a first side, and a second side adapted to seal against the sealing end of the barrel section, the diaphragm body defining a center passageway and a bypass orifice spaced radially from the center passageway, and a sealing ring attached to the outer periphery of the flexible diaphragm body, the sealing ring defining an outer circumferential surface of the diaphragm,
      a first plurality of protruding ribs comprising:
         a first and a second protruding rib on the first side of the diaphragm body, each of the first and second protruding ribs having a first end adjacent the bypass orifice and extending in a curved line to a second end; and
         a third protruding rib on the first side of the diaphragm body that is substantially U-shaped with a first end and a second end, wherein an open end of the U-shaped third protruding rib is oriented toward the center passageway;
      wherein the diaphragm and the valve body are configured to engage in a keyed relationship.

13. The flush valve as claimed in claim 12, the sealing ring further comprising:
   an inner ring attached to the outer periphery of the diaphragm body; and
   an outer ring which defines the outer circumferential surface of the sealing ring.

14. The flush valve as claimed in claim 12, wherein the outer circumferential surface of the sealing ring defines a recessed area,
   wherein the valve body further comprises a protrusion extending from an inner surface thereof, and wherein the recessed area and the protrusion are configured to engage in the keyed relationship between the diaphragm and the valve body.

15. The flush valve as claimed in claim 14, wherein a shape of the recessed area is defined by an indentation in the sealing ring and an imaginary line that extends along the outer circumferential surface of the sealing ring from a first end of the indentation to a second end of the indentation.

16. The flush valve as claimed in claim 15, wherein the recessed area and the protrusion have corresponding shapes.

17. The flush valve as claimed in claim 15, wherein the recessed area is substantially rectangular or trapezoidal-shaped and the protrusion is substantially rectangular or trapezoidal-shaped.

18. The flush valve as claimed in claim 14, wherein the recessed area is defined in the sealing ring at a predetermined angular position with respect to the bypass orifice.

19. The flush valve as claimed in claim 18, wherein the recessed area is positioned approximately 90 degrees from the bypass orifice.

20. The flush valve as claimed in claim 18, wherein the recessed area is positioned approximately 135 degrees from the bypass orifice.

21. The flush valve as claimed in claim 12, wherein the sealing ring is configured to create a seal between the diaphragm and the valve body.

22. A method of assembling a flush valve assembly, the method comprising the steps of:
   a. providing a flush valve diaphragm for use in a flush valve comprising a diaphragm body with an outer periphery, a first side, and a second side, and a sealing ring attached to the outer periphery of the diaphragm body, the sealing ring defining an outer circumferential surface of the diaphragm, the flush valve diaphragm further comprising a first plurality of protruding ribs comprising a first and a second protruding rib on the first side of the diaphragm body, each of the first and second protruding ribs having a first end adjacent a bypass orifice and extending in a curved line to a second end, and a third protruding rib on the first side of the diaphragm body that is substantially U-shaped with a first end and a second end, wherein an open end of the U-shaped third protruding rib is oriented toward a center passageway of the diaphragm body;
   b. providing a flush valve body having an inlet and an outlet;
   c. positioning the flush valve diaphragm in the flush valve body by positioning the flush valve diaphragm into a keyed relationship with the flush valve body; and
   d. establishing a seal between the sealing ring of the flush valve diaphragm and the flush valve body.

23. The method as claimed in claim 22, wherein the outer circumferential surface of the sealing ring defines a recessed area,
   wherein the flush valve body further comprises a protrusion extending from an inner surface, and
   wherein the recessed area and the protrusion are configured to engage in the keyed relationship between the flush valve diaphragm and the flush valve body.

24. The method as claimed in claim 23, wherein the recessed area of the flush valve diaphragm and the protrusion of the flush valve body have corresponding shapes.

25. The method as claimed in claim 23, further comprising the step of defining the bypass orifice in the flush valve diaphragm at a predetermined angular position relative to the recessed area of the flush valve diaphragm.

* * * * *